United States Patent [19]
Lautenschlager et al.

[11] Patent Number: 6,104,792
[45] Date of Patent: *Aug. 15, 2000

[54] METHOD OF PROVIDING CALL CHARGE INFORMATION AS WELL AS SERVICE CONTROL FACILITY, SUBSCRIBER TERMINAL EXCHANGE, TERMINAL, AND COMMUNICATION NETWORK

[75] Inventors: Wolfgang Lautenschlager, Weissach; Uwe Stahl, Leonberg, both of Germany

[73] Assignee: Alcatel N.V., Rijswijk, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,455

[22] Filed: Jun. 27, 1996

[30] Foreign Application Priority Data

Jun. 28, 1995 [DE] Germany ............................ 195 22 988

[51] Int. Cl.[7] .................................................. H04M 15/00
[52] U.S. Cl. .......................... 379/114; 379/121; 379/143; 379/207; 379/230; 455/406
[58] Field of Search ..................................... 379/111, 112, 379/113, 114, 115, 133, 229, 230, 207, 143, 121; 455/406, 407

[56] References Cited

U.S. PATENT DOCUMENTS

| | | |
|---|---|---|
| 4,122,308 | 10/1978 | Weinberger et al. . |
| 4,585,904 | 4/1986 | Mincone et al. . |
| 4,726,056 | 2/1988 | An et al. ..................................... 379/115 |
| 5,303,297 | 4/1994 | Hillis ........................................... 379/11 |
| 5,400,395 | 3/1995 | Berenato .................................. 379/114 |
| 5,420,914 | 5/1995 | Blumhardt .............................. 379/114 |
| 5,488,655 | 1/1996 | Hamlen .................................... 379/114 |
| 5,563,933 | 10/1996 | August et al. ........................... 379/115 |
| 5,748,718 | 5/1998 | Manicone ................................ 379/131 |
| 5,802,502 | 9/1998 | Gell et al. ................................. 705/37 |
| 5,930,343 | 7/1999 | Vasquez .................................. 379/115 |

FOREIGN PATENT DOCUMENTS

| | | |
|---|---|---|
| 0452591 | 10/1991 | European Pat. Off. . |
| 0526118 | 2/1993 | European Pat. Off. . |
| 3305978 | 8/1984 | Germany . |
| 4119672 | 12/1992 | Germany . |
| 4241762 | 6/1994 | Germany . |

OTHER PUBLICATIONS

"Telephone Devices" of the book "Handbook of telecommunications" by Franz Arnold, Ch.7100 published on pp. 12 and 13 by the German Commercial Service (Deutscher Wirtschafsdienst).

"Intelligent Peripheral: Signaling and Protocols" by Surinder K. Jain, ISS '92, Oct. 1992, vol. 2, pp. 117 to 121.

"Intelligent Networks" by W. Rink, Illmenau.Nachrichtenteck, Elektron, Berlin, pp. 162–164.

"Grundlagen der Vermittlungstechnik" by Gerd Siegmund. R. v. Decker's Verlag, G. Schenk, Heidelberg 1991, pp. 92–94.

*Primary Examiner*—Curtis A. Kuntz
*Assistant Examiner*—Binh K. Tieu
*Attorney, Agent, or Firm*—Ware, Fressola, Van Der Sluys & Adolphson LLP

[57] ABSTRACT

The invention concerns a method of informing a subscriber in a communication network about the charge for a desired connection, and a service control facility (SCP), a subscriber switching facility, a terminal (TA) and a communication network for carrying out this method. A subscriber signals a call request, which specifies the desired connection, to the communication network via the terminal (TA). The service control facility (SCP), or the subscriber switching facility, then determines tariff data (T) concerning the charge for a desired connection, independently of the establishment of the desired connection. Before the desired connection has been established, the tariff data (T) are sent to the terminal (TA), which displays the data as tariff data to the subscriber, by means of a display unit.

12 Claims, 4 Drawing Sheets

METHOD OF PROVIDING CALL CHARGE INFORMATION AS WELL AS SERVICE CONTROL FACILITY, SUBSCRIBER TERMINAL EXCHANGE, TERMINAL, AND COMMUNICATION NETWORK

TECHNICAL FIELD

The invention concerns a method of informing a subscriber in a communication network about the charge for a desired connection, wherein a call request specifying the desired connection is signalled by the subscriber via a terminal to a communication network. The invention also concerns a service control facility for connection to a communication network, a subscriber terminal exchange, and a terminal and a communication network.

BACKGROUND OF THE INVENTION

The subscriber in a communication network needs to be informed about the charge for a telecommunication service he has requested.

The invention starts with the charge information on the subscriber side that is usual today. It is described for example in regard to the functions to be provided by the communication network in the chapter "II.3.4 Trunk exchange system" of the book "Basic switching technique" by G. Siegmund, published by R. v. Decker, G. Schenk, Heidelberg 1991 on pages 92 to 94. The functions to be provided by a terminal for that purpose are described in chapter 7.1.0.0 "Telephone devices" of the book "Handbook of telecommunications" by Franz Arnold, published on pages 12 and 13 by the German Commercial Service (Deutscher Wirtschaftsdienst).

As described by Franz Arnold, the subscriber terminal exchange associated with the subscriber sends metering pulses to the terminal whose subscriber is charged for the connection, to inform the subscriber about the charge during the existence of a connection. These metering pulses are transmitted in the user information channel, and the number of transmitted metering pulses is a measure of the charge for the connection. They are detected by the subscriber's terminal, then they are counted and the accumulated sum is shown to the subscriber as charge information. As described by G. Siegmund, the metering pulses themselves are generated by a meter pulse sender in the subscriber terminal exchange, which is controlled by a translator located in the regional junction center. This translator determines the route of a connection, and the charge area assigned to this route. The meter pulse sender is adjusted for the charge area it has determined.

This type of subscriber charge information has the disadvantage that it requires specially equipped terminals.

In addition, a method of establishing a connection is known from U.S. Pat. No. 5,345,502, which uses charge tariffs for the selection of connection paths.

This method of establishing a connection is used to establish a connection between two terminals of mobile subscribers in a network interconnection comprising a number of virtual private service-integrating networks and public networks. With this method, the called subscriber is located by a service by means of a visitor- or a home-data bank. If several connection paths are possible, the selection of one of the connection paths can be made by using the charge tariffs of the connection paths, among others, as a decision criterion.

However, with this method of establishing a connection, the subscriber is not informed about the charge for a call.

SUMMARY OF THE INVENTION

The invention now has the task of informing the subscriber about the charge for a telecommunication service. This task is fulfilled by a charge information method wherein tariff data relating to the charge for the desired connection is determined independently of the establishment of the desired connection, and that the tariff data is sent to the terminal before the desired connection is established.

The task is also fulfilled by a service control facility that is provided with a control unit, a tariffing unit, and a communication facility for receiving call requests from terminals connected to the communication network via the switching facility and for sending tariff data to said terminals via the switching facility, wherein the tariffing unit is designed to determine, from a call request specifying a desired connection and independently of the establishment of the desired connection, tariff data relating to the charge for the desired connection, and that the control unit is designed to initiate the sending of the tariff data to the terminal before the desired connection is established.

It is still further fulfilled by a subscriber terminal exchange that is provided with a tariffing unit and a control unit, wherein the tariffing unit is designed to determine, from a call request specifying a desired connection and independently of the establishment of the desired connection, tariff data relating to the charge for the desired connection, and that the control unit is designed to initiate the sending of the tariff data to the terminal before the desired connection is established.

Still further, it is fulfilled by a terminal and a communication network, wherein the communication network is so designed that from a call request which is signalled by a subscriber via a terminal to the communication network, tariff data relating to the charge for the desired connection is determined independently of the establishment of the desired connection specified in the call request, and that the tariff data is sent to the terminal before the desired connection is established.

The invention is based on the knowledge that the complexity of the charge structure for telecommunication services will increase stiffly with the increase in the number of network operators and the introduction of value-added services. The basic idea of the invention is to determine tariff data from the call request, which is already signalled by a subscriber to the communication network before a connection has been established independently of the establishment of the connection, and send it to the subscriber.

This allows the subscriber to be informed about the charge prior to using a telecommunications service and possibly an additional value-added service, and perhaps not to make use of the telecommunications service at all.

There is the additional advantage of increased charge certainty for calls and services. An additional advantage is that no specially equipped terminals are needed to carry out the method of the invention, as was the case until now. Since the charge information is available before the user channel is opened to the target subscriber, the charge information can be provided verbally via the user channel.

It is particularly advantageous to first route the desired connection to a communication network service, which then takes over the determination of the charge information and the information of the subscriber, and then causes the call to be connected further. This provides a cost-effective and quickly implemented solution for establishing the invention in the existing network structure.

Another advantage of the invention is that additional characteristics can easily be included in a subscriber's charge information. An example is the selection of the most cost-effective connection path from several possible connection paths.

BRIEF DESCRIPTION OF THE DRAWINGS

The invention is explained in the following by means of three configuration examples with the aid of the attached drawings, where.

BEST MODE FOR CARRYING OUT THE INVENTION

A first configuration example explains the application of the method of the invention to a subscriber's charge information by means of a communication arrangement which comprises a communication network of the invention and a service control facility of the invention.

Figure 1:
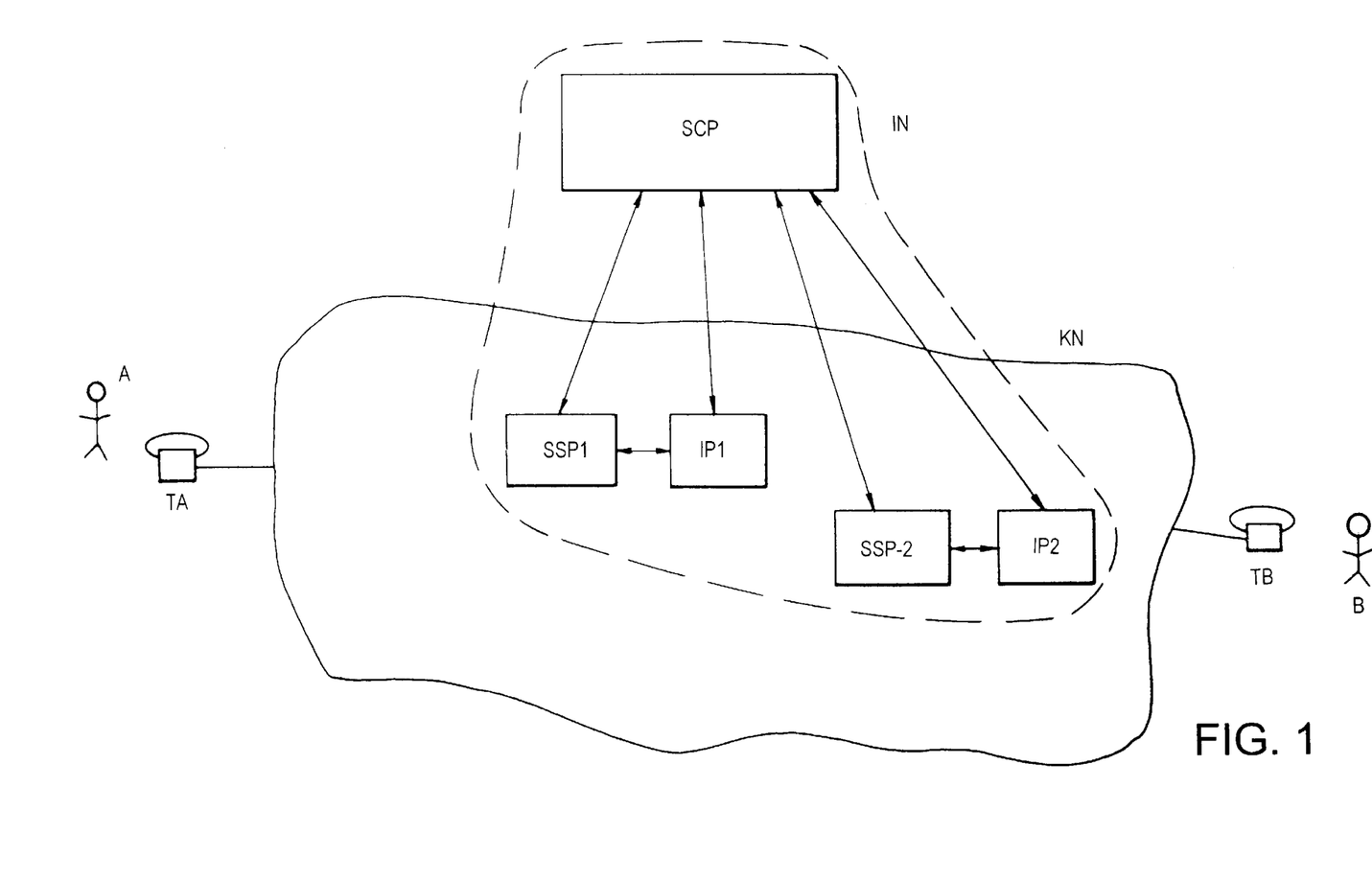
FIG. 1 is a symbolic representation of a communication network of the invention, with a service control facility of the invention.

FIG. 1 depicts the service control facility SCP, the terminals TA and TB, the subscribers A and B, and the communication network KN with the switching facilities SSP1 and SSP2, and the service support systems IP1 and IP2.

Terminals TA and TB are connected to the communication network KN, and subscriber A or B is assigned to them. The switching facilities SSP1 and SSP2 exchange data with the service control facility SCP and with the service support system IP1 or IP2. The service support systems IP1 and IP2 in turn exchange data with the service control facility SCP.

Terminals TA and TB are telephones that are suitable for the communication network KN. However, they can also be any other terminal of a telecommunications network, for example a fax machine or an appropriately equipped computer.

The communication network KN is configured like a usual telephone network and therefore contains several switching facilities as well. The switching facilities SSP1 and SSP2 depicted in FIG. 1 are specially equipped switching facilities. When a call request is made with a determined service identification, they transmit inquiries to the service control facility SCP via a data communication link, and in response receive instructions which concern the further treatment of the desired connection. This service identification is a predetermined elimination number, or any other suitable information, e.g. the call number of a determined group of subscribers, to which a charge information is automatically sent during the establishment of a connection.

It is also possible that the communication network KN is formed of several interconnected subnetworks. For example, such subnetworks can be the networks of different network operators, private networks, public networks or also mobile radio networks.

It is furthermore possible for a different number of switching facilities of the communication network KN to be configured like the switching facilities SSP1 and SSP2. However, at least one such switching facility is required.

The service control facility SCP comprises one or more interconnected computers and peripheral units, which particularly enable a data communication with the switching facilities SSP1 and SSP2 and with the service support systems IP1 and IP2.

Together with the switching facilities SSP1 and SSP2, or the service support systems IP1 and IP2, which are also called "service switching points" and "intelligent peripherals", the service control facility, also called a "service switching point", forms an intelligent network IN by cooperating and providing a service in the communication network KN. The construction of such intelligent networks and a general description of their operation can be found in the article "Intelligent Networks", by W. Rink, in Communications Technology and Electronics, Berlin 40 (1990), book 5, pages 162–164, for example.

However, it is also possible to provide the service without such an intelligent network. Particularly the service control facility SCP can be connected to the switching facilities SSP1 and SSP2 via other communication mechanisms and other protocols.

The switching facilities SSP1 and SSP2 provide data about a connection desired by a subscriber to the service control facility SCP. The latter then uses these data to determine tariff data relating to the charge for the desired connection, and returns these data via the corresponding service support system to the subscriber who has signalled the desired connection.

The service support systems IP1 and IP2 are controlled by the service control facility SCP, and each has a user channel interface and a signalling interface with the switching facility SSP1 or SSP2. It is their task to support the service control facility SCP during communication with a terminal, by providing the corresponding communication functions for the exchange of data via the user and signalling channel, as well as previously stored voice messages and text for display. The precise description of the operation of such a service support system can be found for example in the article "Intelligent peripheral: signalling and protocols" in the Conference Report "ISS'92, October 1992, volume 2" of the "International Switching Symposium 1992", pages 117 to 121.

It is also possible to integrate the required functions of the service support systems IP1 and IP2 into the switching facility SSP1 or SSP2.

Figure 2:
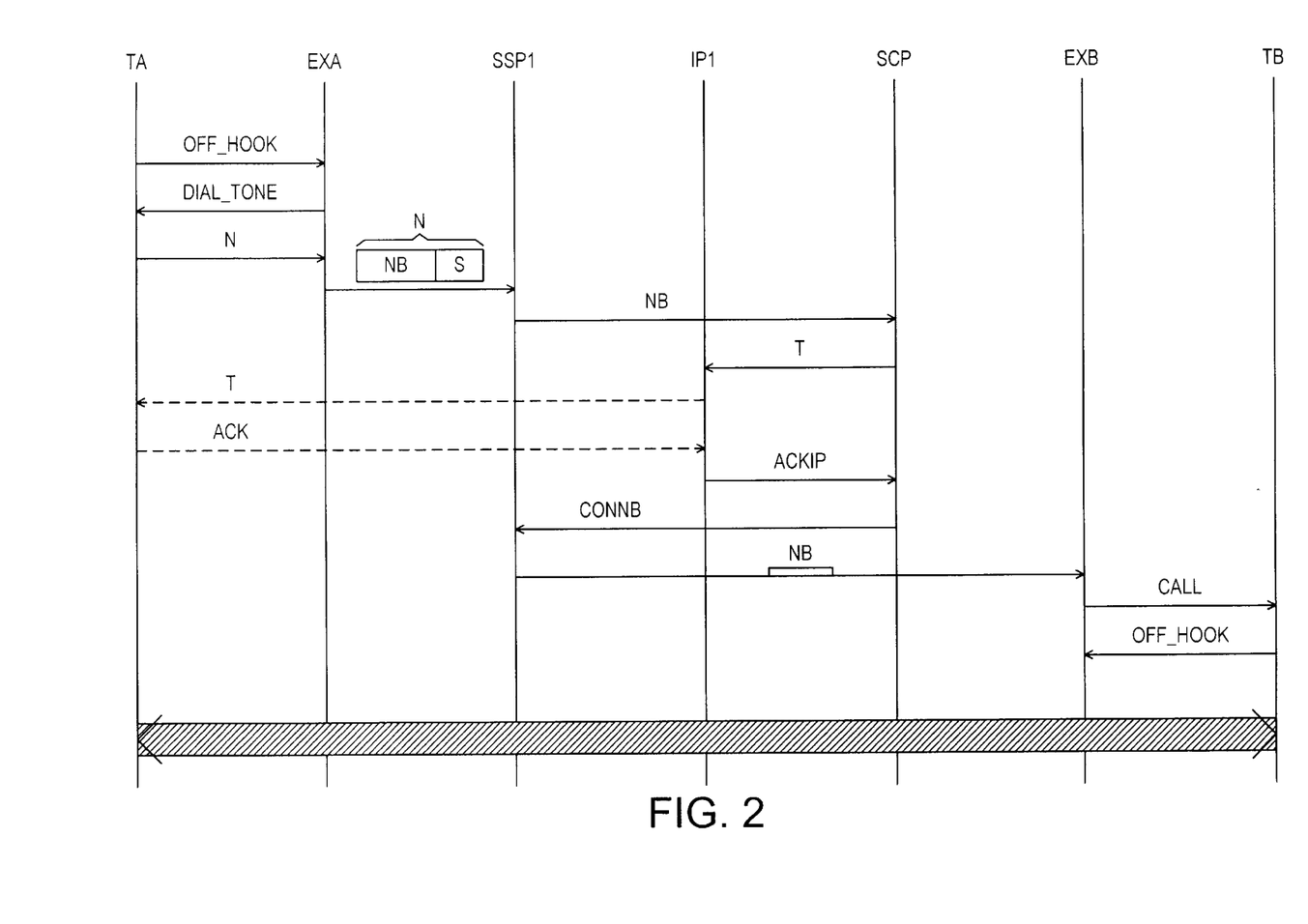
FIG. 2 is a flow diagram for establishing a connection to the communication network in FIG. 1.

The connection process of the service provided by the intelligent network IN will now be described as an example by means of the trunking scheme of subscriber A's terminal TA to the terminal TB of subscriber B:

FIG. 2 is a flow chart, wherein the exchange of messages between terminal TA, a subscriber switching facility EXA assigned to this terminal, the switching facility SSP1, the service support system IP1, the service control facility SCP, a subscriber switching facility EXB assigned to terminal TB, and the terminal TB, are illustrated with respect to time.

Subscriber A lifts the receiver and terminal TA then sends a signalling message ON_HOOK to the subscriber switching facility EXA, which then sends a dial tone DIAL_TONE to the terminal TA.

The subscriber now dials a call number N. This call number is transmitted as a signalling message DIAL_N to the subscriber switching facility EXA in accordance with the signalling method used by terminal TA and the communication network KN. In this case the call number consists of two numbers NB and S. The number NB corresponds to the call number of subscriber B in the communication network KN. The number S precedes the number NB and identifies the service provided by the service control facility SCP.

A call request with call number N is then routed in accordance with the number S through the communication network KN to the switching facility SSP1. The switching facility SSP1 is selected in this instance, but the desired connection could also be routed to switching facility SSP2. The switching facility SSP1 recognizes the number S as an identification signal of the service provided by the service control facility SCP, it then interrupts any further connection process and sends a message with the number NB and a number NA to the service control facility SCP. In this instance, the number NA corresponds to the call number of subscriber A.

Instead of the number NA, it is also possible to use an identification signal that corresponds to the switching facility EXA, or to omit sending the number NA altogether.

From the number NB, which specifies the call request of subscriber A, and from the number NA, the service control facility SCP now determines tariff data T, which describe the charge for this desired connection. It then sends a message with the tariff data T to the service support system IP1, which instructs the former to send the tariff data T to subscriber A. The switching facility SSP1 now establishes a user channel between the service support system IP1 and the terminal TA. The tariff data T are sent by means of a voice message through this user channel.

It is also possible to send the tariff data in digital form to the terminal TA. Such a transmission can take place for example via a signalling channel or in coded form via the user channel. In this case the D channel in particular can be used, which is available with the ISDN signalling method, or the coding method used for tone dialing. However, in these cases it would be necessary to equip the terminal TA accordingly, for example to detect and display such tariff data by means of corresponding devices.

If the subscriber A receives the tariff data T via his terminal TA, he has the possibility of selecting to continue or to interrupt the connection process. If he chooses to continue the connection process, he sends a message ACK via terminal TA to the service support system IP1 through the already established user channel. The message ACK is a confirming word spoken by the subscriber A, which is recognized by the service support system IP1 through voice recognition. If the service support system IP1 recognizes the message, it sends a message ACKIP in turn to the service control facility SCP.

It is also possible for the message ACK to be a digital message transmitted via the D channel, or a coded signal transmitted via the user channel, for example a dial tone or a sequence of dial tones. Such coded signals can easily be generated by the subscriber by activating one or more dialing keys.

If the subscriber A decides against continuing the connection process, he sends a different message to the service support system IP1 via his terminal TA.

The same information as for the message ACK applies to this message.

However, it is also possible that no such message is provided. The service control facility SCP would then discontinue any further connection process after a predetermined time has expired, or after the subscriber A hangs up.

It is also possible to omit the message ACK. The service control facility SCP would then continue the connection process to subscriber B either immediately, or a predetermined time after the tariff data T had been sent. Any unwanted connection could be discontinued by subscriber A by hanging up the receiver.

If the service control facility SCP receives the message ACKIP, it continues the connection process through the switching facility SSP1 by sending it a message CONNB. In this way, a call request using the number NB as the call number is routed through the communication network KN to the subscriber switching facility EXB, which then informs the subscriber B of the call request by sending him a call CALL. If the subscriber B lifts the receiver, an OFF HOOK signalling message is sent by terminal TB to the subscriber switching facility EXB, which establishes a user channel CH between the terminals TA and TB.

It is also possible for the service control facility SCP not to continue the connection process, but to limit itself to informing the subscriber A about the charge for the desired connection.

It is furthermore possible to apply a charge for the use of this method. A more precise structure of the service control facility SCP is explained in greater detail in the following, by means of FIG. 3.

Figure 3:
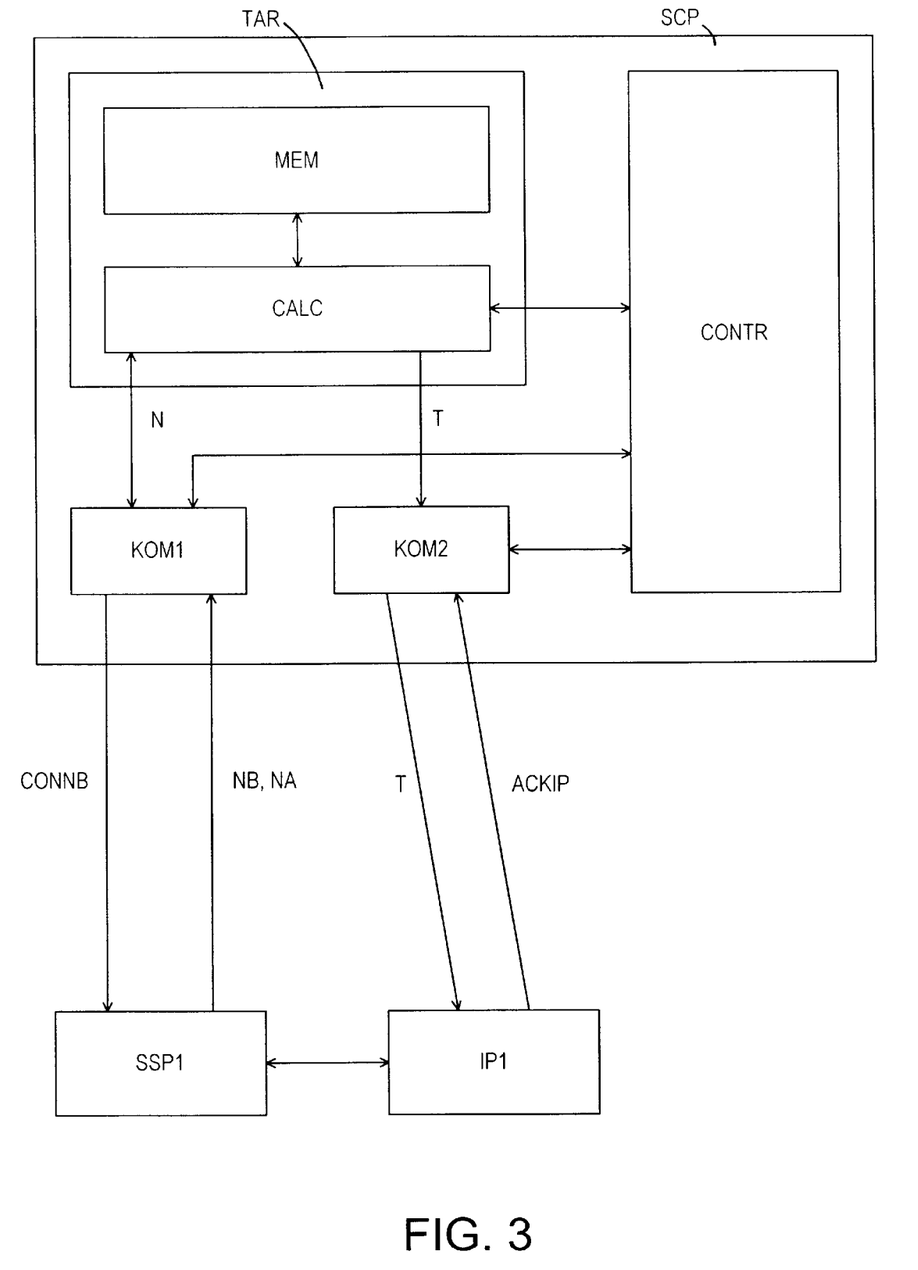
FIG. 3 is a block circuit diagram of the service control facility of the invention in FIG. 1.

FIG. 3 depicts the service control facility SCP, the switching facility SSP1 and the service support system IP1, which exchange messages with each other. The switching facility SSP2 and the service support system IP2 are not shown here, since in this example no exchange of messages takes place between these units and the service control facility SCP.

The service control facility SCP contains a tariffing unit TAR, a control unit CONTR and two communication facilities KOM1 and KOM2. The communication facility KOM1 exchanges data with the switching facility SSP1, and sends data to the tariffing unit TAR. The communication facility KOM2 receives data from the tariffing unit TAR, and sends data to the service support system IP1. The control unit CONTR exchanges data with the tariffing unit TAR and with communication facilities KOM1 and KOM2.

The communication facilities KOM1 and KOM2 provide the necessary communication services for the exchange of data with the switching facility SSP2 or the service support system IP1. The mechanisms which are used for this purpose can be found in the above-cited articles.

The tariffing unit TAR determines the tariff data T for a desired connection. It contains a memory unit MEM and a processing unit CALC, which exchange data with each other.

The memory unit MEM stores data about the tariffs of network operators and service providers. In this case, such a tariff contains the information of how much the use of the offered communications service costs per unit of time until the actual time of the desired connection. Such a tariff can also depend on a number of parameters, for example on the distance between sender and receiver, on the date or the time of day, on the person of the sender or the receiver, or on the network status. Each of these tariffs has been assigned characteristic features which enable the assignment of tariffs for a desired connection. For example, such a characteristic feature could contain the service identification or the network exclusion number for a service or a network of a network operator.

It is also possible that the memory unit MEM is not located in the service control facility SCP. The data stored in the memory unit MEM would then be stored in a data bank for example, which the processing unit CALC can access.

In this case it is also possible for the processing unit CALC to request these data, or a portion of these data, directly from corresponding data banks of the different network operators and service providers.

The processing unit CALC determines the tariff data for a desired connection from the data in the memory unit MEM. In this case a desired connection is specified by the call number of a subscriber in the communication network KN.

However, it is also possible for a desired connection to refer to a personal identification of a subscriber and to be specified in this manner. This is the case with mobile radio, for example.

The processing unit CALC first analyzes the desired connection by means of the characteristic features stored in the memory unit MEM, and then determines the tariff or tariffs that are assigned to this desired connection. The case of a connection having been assigned several tariffs can occur for example, when connection paths of several network operators are used, or when the target of the connection is a service that is subject to a charge. The processing unit CALC then assigns the necessary parameters to the determined tariffs. In this case, the distance between subscribers A and B is determined by the numbers NA and NB, for example. The parameters are then used to calculate the cost to be charged per unit of time for the established connection. These charges are forwarded as the tariff data T to the communication facility KOM1.

In addition to these data, it is also possible for the processing unit CALC to determine other data and forward them as tariff data. For example, such data could concern the network operator to be used, or the transmission path to be used.

The control unit CONTR controls the process of the functions in the service control facility SCP, as well as the communication between the service control facility SCP and the terminals of the communication network KN.

When a call request is received by the communication facility KOM1, it is forwarded to the tariffing unit TAR and causes the tariff data to be determined, which is then forwarded to the service support system IP1 via the communication facility KOM2. After the message ACKIP is received, it causes the message CONNB to be sent to the switching facility SSP1, which in turn causes a further connection to be established.

Beyond that, it is also possible for the control unit to create other voice messages for guidance of the user, or as user information, by sending the corresponding control commands via the communication facility KOM2. Such user information could for example contain messages about special offers regarding communication services that are presently available.

It is possible for the service control facility SCP to contain additional units used to determine alternative connection paths of a desired connection. When such alternative connection paths are feasible, tariff data would be determined for each of these connection paths, and the least expensive connection path would then be chosen. However, the tariff data for all of these connection paths could also be sent to the respective subscriber, who would then interactively select one of the possible connection paths.

It is also possible to activate additional characteristic features, such as the determination of the most favorable connection path through interactive communication between subscriber and control unit, or by simply selecting a predetermined service identification.

The use of a method of the invention for informing a subscriber of the charge by means of a communication facility is clarified in a second configuration example, which contains a communication network according to the invention with a subscriber switching facility according to the invention.

This communication facility is constructed as shown in FIG. 1, except that the service provided by the intelligent network IN is integrated into the subscriber switching facility EXA of subscriber A. The same applies to the establishment of the connection between subscriber A and subscriber B in FIG. 2. In contrast to the first configuration example, in this case the tariff data T are directly determined by the subscriber switching facility EXA and are sent to the terminal TA.

These functions are also provided by a service support system and a service control unit as shown in FIG. 3. However, it is also possible to integrate the corresponding functions of FIG. 3 directly into the switching facility EXA.

A third configuration example explains the operation of a terminal according to the invention, which is used for the communication facility of the first configuration example.

The communication facility is constructed as shown in FIGS. 1 to 3. However, instead of the terminal TA, a terminal TA' is used, which is a terminal that is especially designed to determine charges in accordance with the method of the invention.

Figure 4:
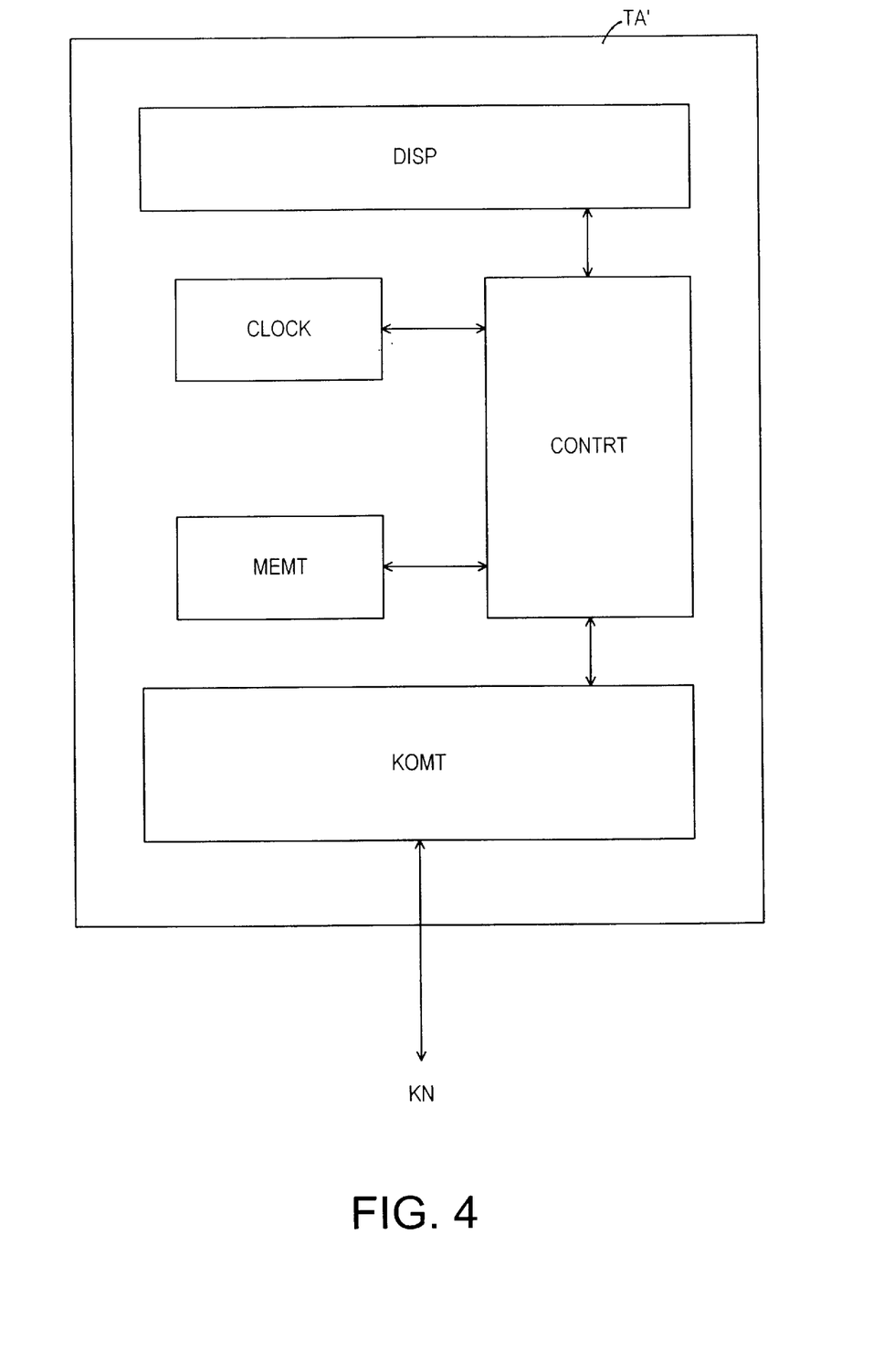
FIG. 4 is a block circuit diagram of a terminal of the invention for the communication network of the invention in FIG. 1.

FIG. 4 depicts the terminal TA'. It comprises a communication facility KOMT, a control unit CONTRT, a timer CLOCK, a memory MEMT and a display unit DISP.

The control unit CONTRT exchanges data with the communication facility KOMT, with the memory unit MEMT, the timer CLOCK, and the display unit DISP. The communication facility KOMT is connected to the communication network KN.

The communication facility KOMT performs all the usual communication functions of an ISDN terminal. In this way it has the facilities for inputting the dialing information, it carries out the subscriber signalization and makes one or more user channels available to the subscriber.

Tariff data received by the communication network KN are stored in the memory unit MEMT. The timer CLOCK sends a timing signal to the control unit CONTRT. The display unit DISP contains a liquid-crystal display for example, on which numbers or text can be displayed.

It is also possible to use existing installations in the communication facility KOMT for the memory unit MEMT, the timer CLOCK and the display unit DISP.

The control unit CONTRT is used to control the charge detection in the terminal TA'. Between the signalization of a call request by the communication facility KOMT and the establishment of this connection, the control unit CONTRT monitors the signalization channel, whether a message with tariff data is being sent by the communication network KN. The monitoring can also take place while a connection is in existence, e.g. because of a possible tariff change. If a message is received from the communication facility KOMT during this time period, and if the control unit CONTRT detects a message with tariff data in this message, it withdraws the tariff data from the message and stores them in the memory unit MEM.

It is also possible to transmit the message in coded form. This is advantageous for example if the terminal TA' has an ADSI interface (Analog Display Service Interface) which is particularly necessary if the terminal TA' is not an ISDN terminal.

It is advantageous if the control unit CONTRT, after storing the tariff data in the memory unit MEMT, causes it to be shown on the display unit DISP.

As soon as the control unit CONTRT receives a message from the communication facility that the desired connection has been established, it starts to calculate the accumulated charge. To calculate this, it multiplies the cost per unit of time contained in the tariff data by the time that has expired since the connection was established, which is determined by means of the time signal provided by the timer CLOCK. This calculation can be performed at regular intervals during the connection, upon a request from the subscriber, or at the end of a connection. After the report, the charges are shown to the subscriber A by means of display unit DISP. These charges can be displayed in any desired unit.

It is also possible not to calculate the charges, but only to report the tariff data received from the communication network KN.

It is also possible for the control unit to control the provision of other characteristic features to inform subscriber A of the charge, particularly the provision of the characteristic features indicated in FIGS. 2 and 3.

what is claimed is:

1. A method of informing a subscriber (A) in a communication network (KN) about the charge for a desired connection wherein a call request specifying the desired connection and a request for tariff data (T) are signalled by the subscriber (A) via a terminal (TA) to the communication network (KN) by dialing a number (N), characterized in that tariff data (T) relating to the charge for the desired connection is determined independently of the establishment of the desired connection, and that the tariff data (T) is sent to the terminal (TA) before the desired connection is established, and further characterized in that the call request is directed to a service of the communication network (KN) which determines the tariff data (T) without connecting the subscriber (A) to a billing system of the communication network (KN), wherein the communication network (KN) further comprises a service control facility (SCP) and a switching facility (SSP1, SSP2) for transmitting the call request to the service control facility (SCP) and for receiving in response from the service control facility (SCP) instructions which concern a further treatment of the desired connection, and wherein the call number (N) includes a service identifying number (S) to identify a service provided by the service control facility (SCP) in order for the call request with the call number (N) to be routed in accordance with the service identifying number (S) to the switching facility (SSP1, SSP2).

2. A method as claimed in claim 1, wherein the desired connection is intended for a receiving subscriber (B) via a receiver terminal (TB), and the call number (N) further includes a receiver number (NB) associated with the receiver terminal (TB), wherein the switching facility (SSP1, SSP2) sends a message to the service control facility (SCP) with the receiver number (NB).

3. A method as claimed in claim 2, wherein the service identifying number (S) precedes the receiver number (NB) when the call number (N) is routed to the switching facility (SSP1, SSP2) so as to cause the switching facility (SSP1, SSP2) to interrupt any further connection process and send a message with the receiver number (NB) to the service control facility (SCP) upon recognizing the service identifying number (S) as an identification signal of the service provided by the service control facility (SCP).

4. A method as claimed in claim 3, wherein the message sent by the switching facility (SSP1, SSP2) to the service control facility (SCP) contains a caller number (NA).

5. A method as claimed in claim 4, wherein the service control facility (SCP) determines cost to be charged for the established connection from the receiver number (NB) and the caller number (NA) and the cost is forwarded as the tariff data (T).

6. A method as claimed in claim 3, wherein the communication network (KN) further comprises a service support system (IP1) controlled by the service control facility (SCP), said service support system (IP1) having a user channel interface and a signalling interface with the switching facility (SSP1, SSP2) to support the service control facility (SCP) during communication with the terminal (TA), and wherein the service support system (IP1) sends a message (ACKIP) to the service control facility (SCP) when the service support system (IP1) receives and recognizes an acknowledge message (ACK) from the subscriber (A) signifying acceptance of the charge.

7. A method as claimed in claim 6, wherein the service control facility (SCP), upon receiving the message (ACKIP), sends a connection message (CONNB) to the switching facility (SSP1, SSP2), causing the switching facility (SSP1, SSP2) to route the call request to a receiving switching facility (EXB) assigned to the receiver terminal (TB), thereby informing the receiving subscriber (B) of the call request by sending a message (CALL) to the receiver terminal (TB).

8. A method of providing a connection service for a calling subscriber (A) making a call request via a caller terminal (TA) associated with a caller number (NA) requesting a desired connection to a receiver terminal (TB) associated with a receiver number (NB) in a communication network (KN), wherein the communication network (KN) comprises:

a service control facility (SCP), and a switching facility (SSP1);

said method comprising the sequential steps of:
1) the calling subscriber (A) dialing a call number (N) which consists of a service identifying number (S) to identify a service provided by the service control facility (SCP) and the receiver number (NB);
2) the caller terminal (TA) sending the service identifying number (S) preceding the receiver number (NB) to the switching facility (SSP1);
3) upon recognizing the service identifying number (S) as an identification signal of the service provided by the service control facility (SCP), the switching facility (SSP1) interrupting any further connection process;
4) the switching facility (SSP1) sending the receiver number (NB) to the service control facility (SCP);
5) from the receiver number (NB) the service control facility determining tariff data (T) independently of the establishment of the desired connection; and
6) sending the tariff data (T) to the caller terminal (TA) before the desired connection is established.

9. A method as claimed in claim 8, further comprising the steps of:
7) sending an acknowledge message (ACK) from the calling subscriber (A) via the calling terminal (TA) to the service control facility (SCP) signifying a desire of continuing the connection process;
8) the service control facility (SCP) sending a connection message (CONN) to the switching facility (SSP1); and
9) the switching facility (SSP1) routing the call request using the receiver number (NB) to the receiver terminal (TB).

10. A method as claimed in claim 9, further comprising the step of:

10) the switching facility (SSP1) sending the caller number (NA) to the service control facility (SCP) so as to allow the service control facility (SCP) to determine the tariff data (TA) from the caller number (NA).

11. A method as claimed in claim 9, wherein the communication network (KN) further comprises a receiver switching facility (EXB) assigned to the receiver terminal (TB) and a caller switching facility (EXA) assigned to the caller terminal (TA), said method further comprising the step of:

10) the switching facility (SSP1) sending an identification signal corresponding to the caller switching facility (EXA) to the service control facility (SCP) so as to allow the service control facility (SCP) to determine the tariff data (T) from the identification signal.

12. A method as claimed in claim 9, wherein the communication network (KN) further comprises a service support system (IP1) for relaying the tariff data (T) from the service control facility (SCP) to the caller terminal (TA) and relaying the acknowledge message (ACK) from the caller terminal (TA) to the service control facility (SCP) with a message (ACKIP).

* * * * *